United States Patent [19]
Nakamura

[11] Patent Number: 6,035,139
[45] Date of Patent: Mar. 7, 2000

[54] CAMERA FOR FLASH PHOTOGRAPHY

[75] Inventor: Katsunori Nakamura, Kawasaki, Japan

[73] Assignee: Canon Kabushiki Kaisha, Tokyo, Japan

[21] Appl. No.: 09/122,382

[22] Filed: Jul. 27, 1998

[30] Foreign Application Priority Data

Jul. 31, 1997  [JP]  Japan ................................ 9-206580

[51] Int. Cl.⁷ ............................ G03B 13/36; G03B 15/05
[52] U.S. Cl. ............................................ 396/121; 396/159
[58] Field of Search .................................. 396/121, 122, 396/123, 233, 234, 159

[56] References Cited

U.S. PATENT DOCUMENTS

| | | | |
|---|---|---|---|
| 4,164,368 | 8/1979 | Miyata | 354/23 R |
| 4,974,007 | 11/1990 | Yoshida | 354/402 |
| 5,111,231 | 5/1992 | Tokunaga | 354/402 |
| 5,381,208 | 1/1995 | Takagi | 396/121 |
| 5,450,162 | 9/1995 | Suzuki et al. | 354/416 |

FOREIGN PATENT DOCUMENTS 41 00 481  7/1992  Germany .

OTHER PUBLICATIONS

European Search Report dated Nov. 24, 1998.

*Primary Examiner*—W. B. Perkey
*Attorney, Agent, or Firm*—Fitzpatrick, Cella, Harper & Scinto

[57] ABSTRACT

In a camera in which a sensor receives reflected light from a subject during flash emission to control the amount of flash light emission on the basis of the output of the sensor, a plurality of focus detecting areas are provided within a light-receiving area of the sensor, and when one of the plurality of focus detecting areas is selected for focus adjustment, the camera sets an evaluation criterion for the output of the sensor in accordance with a position of the selected focus detecting area.

12 Claims, 11 Drawing Sheets

FIG. 10

FAR DISTANCE

| FOCUS DETECTING AREA | LIGHT ADJUSTING SENSOR | | |
|---|---|---|---|
| | A | B | C |
| a1 | -1.2 | -0.2 | -0.2 |
| a2 | 0 | +1.0 | +1.0 |
| a3 | -0.6 | +0.4 | +0.4 |
| b1 | -1.5 | -1.5 | -0.5 |
| b2 | -0.6 | -0.6 | +0.4 |
| b3 | -0.9 | -0.9 | +0.1 |
| c1 | -0.2 | -1.2 | -0.2 |
| c2 | +1.0 | 0 | +1.0 |
| c3 | +0.4 | -0.6 | +0.4 |
| d1 | -0.5 | -1.5 | -1.5 |
| d2 | +0.4 | -0.6 | -0.6 |
| d3 | +0.1 | -0.9 | -0.9 |
| e1 | -0.2 | -0.2 | -1.2 |
| e2 | +1.0 | +1.0 | 0 |
| e3 | +0.4 | +0.4 | -0.6 |

FIG. 11

NEAR DISTANCE

| FOCUS DETECTING AREA | LIGHT ADJUSTING SENSOR | | |
|---|---|---|---|
| | A | B | C |
| a1 | -0.6 | +0.4 | +0.4 |
| a2 | 0 | +1.0 | +1.0 |
| a3 | -0.3 | +0.7 | +0.7 |
| b1 | -0.75 | -0.75 | +0.25 |
| b2 | -0.3 | -0.3 | +0.7 |
| b3 | -0.45 | -0.45 | +0.55 |
| c1 | +0.4 | -0.6 | +0.4 |
| c2 | +1.0 | 0 | +1.0 |
| c3 | +0.7 | -0.3 | +0.7 |
| d1 | +0.25 | -0.75 | -0.75 |
| d2 | +0.7 | -0.3 | -0.3 |
| d3 | +0.55 | -0.45 | -0.45 |
| e1 | +0.4 | +0.4 | -0.6 |
| e2 | +1.0 | +1.0 | 0 |
| e3 | +0.7 | +0.7 | -0.3 |

| FOCUS DETECTING AREA | LIGHT ADJUSTING SENSOR | | |
|---|---|---|---|
| | A | B | C |
| SL | 0 | +1.0 | +1.0 |
| SC | +1.0 | 0 | +1.0 |
| SR | +1.0 | +1.0 | 0 |

CAMERA FOR FLASH PHOTOGRAPHY

BACKGROUND OF THE INVENTION

1. Field of the Invention

The present invention relates to an apparatus and method for controlling the amount of flash emission in a camera having a plurality of focus detecting areas.

2. Description of Related Art

In a conventional camera, the relationship between a plurality of focus detecting areas and a plurality of light adjusting sensors (flash light amount detecting means) for detecting amounts of flash light incident on a photographing image plane is made, for example, as shown in FIG. 12. That is, a light adjusting sensor unit composed of three separately provided light adjusting sensors has three light amount detectable areas A', B' and C' respectively serving as the light adjusting sensors, with focus detecting areas SL, SC and SR being respectively located within the central sections of the light amount detectable areas A', B' and C' which can provide the maximum detection sensitivity. In each of the light amount detectable areas, the sensor sensitivity successively decreases as the distance from the central sections increases, and points on each of the curves LA1 to LA5 in each of the light amount detectable areas A', B' and C' have the same sensor sensitivity.

Furthermore, in the above camera, an in-focus area can be selectively set from the plurality of focus detecting areas SL, SC and SR, and the light adjusting sensor having the light amount detectable area including the selectively set in-focus area is chosen to determine a target detected amount of received light by the selected light adjusting sensor on the basis of a film ISO sensitivity, an aperture value or the like. On the other hand, in terms of the light adjusting sensors each having the light amount detectable area not including the in-focus area, the correction of the target detected amount of received light takes place to equally exceed the aforesaid target detected amount of received light by a given or predetermined value.

For instance, in the case of focusing in the focus detecting area SC being at the central position, a decision is made that there is a person or subject in the central location, and a method to mainly weight the central sensor B is taken so that this central location provides an appropriate light emission amount. Thus, as shown in FIG. 13, the correction amount "0 step" for the target detected amount of received light is set with respect to the sensor B, whereas the correction amount "+1.0 step" for the target detected amount of received light is set with respect to the sensors A and C, respectively.

The correction amount "0 step" set for the sensor B signifies that the target detected amount of received light is set through the use of a value directly calculated on the basis of the film ISO sensitivity, the aperture value or the like, and the correction amount "+1.0 step" to be set for the sensors A and C means that the target detected amount of received light is set to exceed that amount by +1.0 step. This is for the purpose of, in the case of bringing a central subject into focus and of photographing the central subject with a proper flash light amount and in a scene where the central subject is considerably remote and an object exists at a left or right position closer than the central subject, preventing the left or right object from abnormally resulting in an overexposure.

Likewise, in the case of focusing in the left focus detecting area SL, the weighting is done with the correction amount "0 step" with respect to the sensor A while being done with the correction amount "+1.0 step" with respect to the sensors B and C. On the other hand, in the case of focusing in the right focus detecting area SR, the weighting based on the correction amount "0 step" takes place with respect to the sensor C while the weighting by the correction amount "+1.0 step" is done for the sensors A and B.

After the target detected amounts of received light are thus set for the respective light adjusting sensors, the flash light emission takes place, and when the detected amount of received light for one of the light adjusting sensors reaches the target detected amount of received light set for that light adjusting sensor, the flash light emission is put to an end.

In the case where, like the example of FIG. 12, the number of focus detecting areas is relatively small and they are in one-to-one corresponding relation to the light amount detectable areas (that is, the divisional number of the light adjusting sensors), a need for complicated control does not particularly exist.

However, the latest cameras have a tendency to sharply increase the number of focus detecting areas, and hence, if the number of focus detecting areas is set to equal the divisional number of the light adjusting sensors, the cost for the light adjusting sensors increases.

In addition, the increase in the number of focus detecting areas causes a larger-size of the focus detecting apparatus, which requires that the light adjusting sensors are disposed close to the film surface. What's more, for example, bringing the light adjusting sensors close to the film surface makes a significant difference between the light adjusting sensor sensitivity for the central section of the film surface and the light adjusting sensor sensitivity for the upper and lower sections of the film surface, and therefore, difficulty is encountered to equally accomplish the flash light amount control as mentioned above between the case where the focus detecting area placed in a high-sensitivity section is chosen as the in-focus area and the case where the focus detecting area placed in a low-sensitivity section is selected as the in-focus area.

Furthermore, in a case where the automatic in-focus area selecting function selects a plurality of in-focus areas, since only one in-focus area with a high reliability is extracted from these in-focus areas and the target detected amounts of received light for the light adjusting sensors other than the light adjusting sensor corresponding to the extracted in-focus area are corrected to equally exceed, by a given value, the target detected amount of received light of the light adjusting sensor corresponding to the extracted in-focus area, when all the focus detecting areas are at the low-sensitivity portions of the light adjusting sensors, the overexposure photography occurs similarly.

Still further, the size of the subject and the distance therefrom have great influence in terms of the sensitivity distribution of the light adjusting sensors resulting in large difference in the flash light emission amount, so that there appears a difference among the pictures taken using the flash light emission.

BRIEF SUMMARY OF THE INVENTION

The present invention has been developed in order to eliminate the above-mentioned problems, and it is an object of the present invention to provide a camera system which is capable of accomplishing appropriate control of the flash light emission amount.

In a camera system according to the present invention which controls a flash light emission amount of a flash device on the basis of an output of sensor means for receiving reflected light from a subject during flash light emission by the flash device, and which performs a focus adjusting operation by selecting one or more of a plurality of focus detecting areas provided within an image plane area corresponding to a light-receiving area for an image plane in the sensor means, there is provided a control circuit which controls the flash light emission amount of the flash device by setting an evaluation criterion for the output of the sensor means in accordance with a position of the light-receiving area in the sensor means corresponding to the selected focus detecting area, so that, even if a plurality of focus detecting areas exist within the light-receiving area in the same sensor means, appropriate control of the flash light emission amount is performed.

In accordance with the invention, for the above-mentioned purpose, as an arrangement for the proper control of the flash light emission amount, the control circuit differently weights the output of the sensor means in accordance with a position within the light-receiving area in the sensor means corresponding to the selected focus detecting area.

In accordance with the invention, for the above-mentioned purpose, as an arrangement for the proper control of the flash light emission amount, the control circuit sets a target amount of received light for the sensor means to a different value in accordance with a position within the light-receiving area in the sensor means corresponding to the selected focus detecting area.

In accordance with the invention, for the above-mentioned purpose, as an arrangement for the proper control of the flash light emission amount, in a configuration where the sensor means includes a plurality of sensor means and a plurality of focus detecting areas are placed within an image plane area corresponding to a light-receiving area for an image plane in each of the plurality of sensor means, when the focus detecting areas corresponding to in-focus areas during focusing adjustment exist within the light-receiving areas of two or more sensor means, an evaluation criterion for an output of each of the sensor means having the light-receiving areas within which the focus detecting areas corresponding to the in-focus areas exist is made to be different from an evaluation criterion for an output of each of the other sensor means.

In accordance with the invention, for the above-mentioned purpose, in a camera system which controls an flash light emission amount of a flash device on the basis of outputs of a plurality of sensor means for receiving reflected light from a subject during flash light emission by the flash device, and which performs a focus adjusting operation by selecting one or more of a plurality of focus detecting areas provided within an image plane area corresponding to light-receiving areas for an image plane in the plurality of sensor means, there is provided a control circuit which sets an evaluation criterion for an output of the sensor means having the light-receiving area corresponding to the selected focus detecting area, wherein an evaluation criterion for an output of each of the other sensor means is set by the control circuit to a value different from the evaluation criterion for the output of the sensor means having the light-receiving area corresponding to the selected focus detecting area.

These and other objects and features of the invention will become apparent from the following detailed description of a preferred embodiment thereof taken in conjunction with the accompanying drawings.

BRIEF DESCRIPTION OF THE SEVERAL VIEWS OF THE DRAWING

FIG. 10 is a table showing correction data (in the case of a far distance) for a target detected amount of received light in the light adjusting sensor unit.

FIG. 11 is a table showing correction data (in the case of a near distance) for a target detected amount of received light in the light adjusting sensor unit.

DETAILED DESCRIPTION OF THE INVENTION

Hereinafter, a preferred embodiment of the invention will be described in detail with reference to the drawings.

Figure 1:
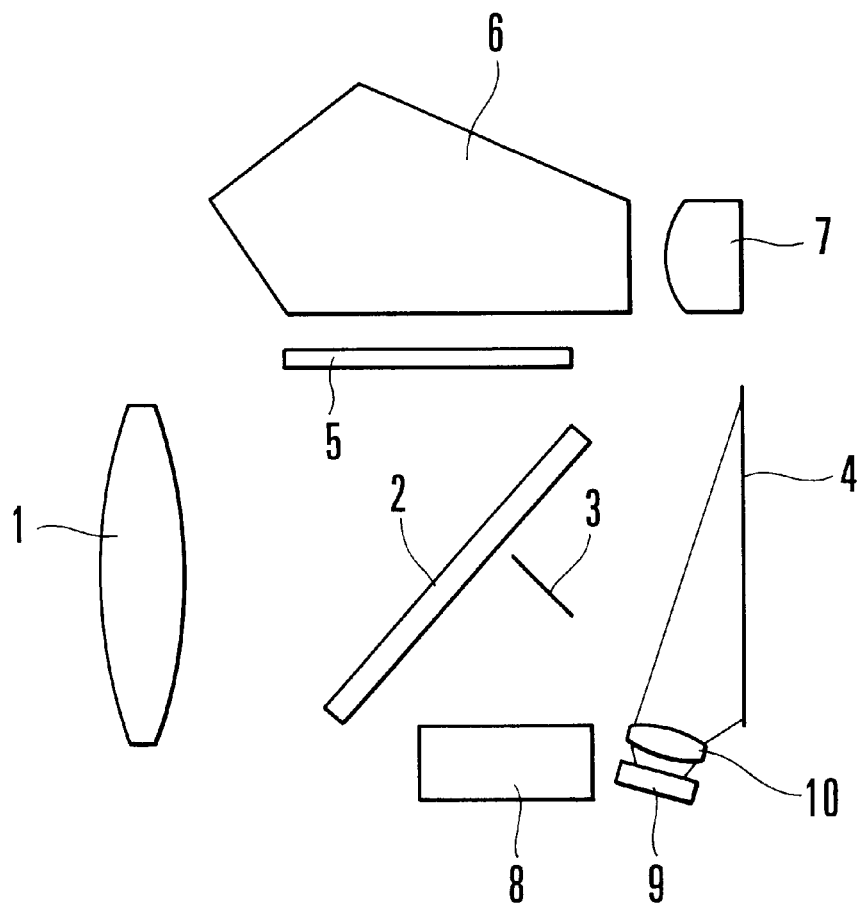
FIG. 1 is an illustration of the arrangement of a camera according to a first embodiment of the present invention.

FIG. 1 is an illustration of the arrangement of a camera according to the embodiment of the invention. In FIG. 1, reference numeral 1 designates a photographing lens, and reference numeral 2 depicts a main mirror for leading light passing through the photographing lens 1 toward the viewfinder side, with the central section thereof constituting a half-transmissive section. The light passing through this half-transmissive section is led through a sub-mirror 3 to an AF (automatic focusing) unit 8.

Furthermore, reference numeral 4 represents a film surface. During flash photography using a flash device, the light reflected from the film surface 4 goes through a light adjusting lens 10 to be detected by a light adjusting sensor unit 9, thus controlling the flash light emission amount of the flash device.

Still further, reference numeral 5 denotes a focusing screen which forms a photographed image on the viewfinder so that the photographer can see the in-focus condition, reference numeral 6 signifies a pentagonal prism, and reference numeral 7 stands for an eyepiece lens.

Figure 2:
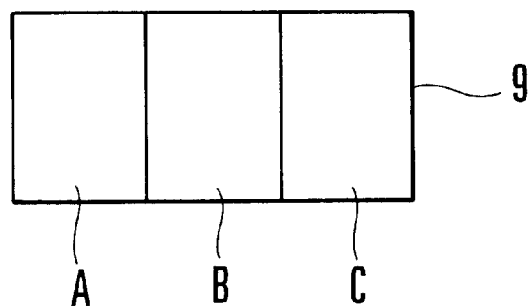
FIG. 2 is a front elevational view showing a light adjusting sensor unit employed for the camera.
Figure 3:
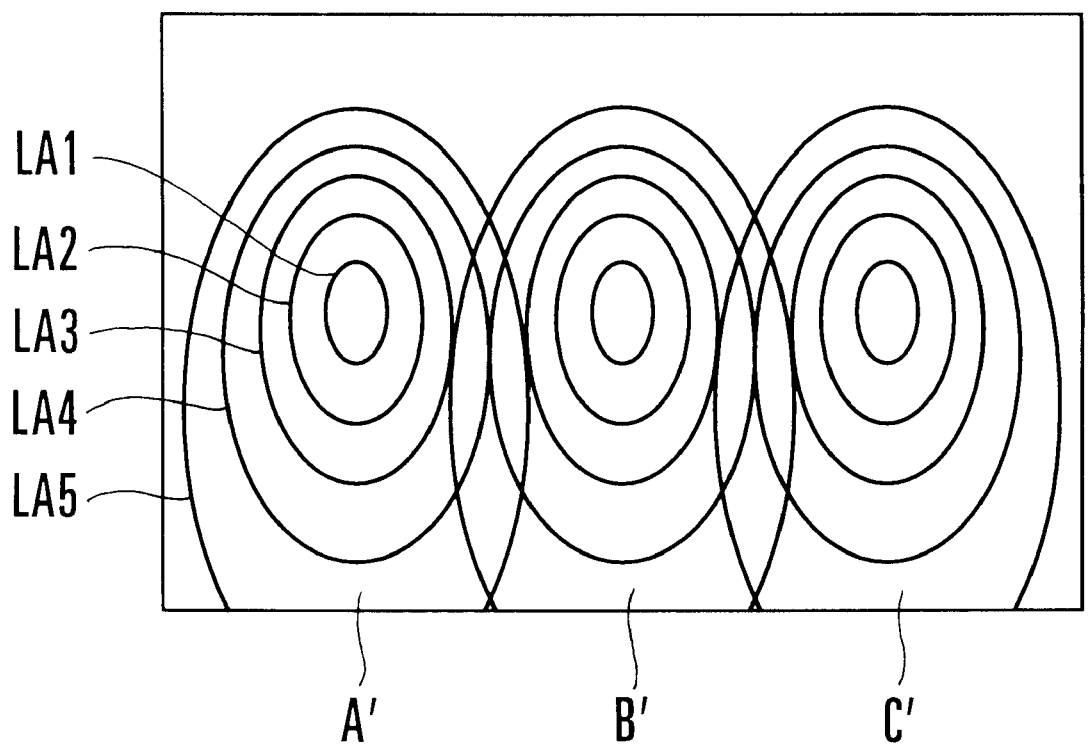
FIG. 3 is an illustration of a sensitivity distribution of the light adjusting sensor unit.

The light adjusting sensor unit 9 is, as shown in FIG. 2, divided into three light adjusting sensors (flash light amount detecting means) designated at characters A, B and C, respectively, so that the flash light reflected from the film surface 4 is detectable in three areas. FIG. 3 shows three light amount detectable areas in the light adjusting sensor unit 9 and a sensitivity distribution in each of the light amount detectable areas of the light adjusting sensor unit 9 in a corresponding relation to a film surface. In FIG. 3, in the light adjusting sensor unit 9, the light adjusting sensors A, B and C have light amount detectable areas A', B' and C', respectively.

In addition, the center (the center of the section surrounded by an equi-sensitivity curve LA1) of each of the light amount detectable areas provides the maximum sensor sensitivity, and the amount of light led to the light adjusting sensor unit 9 decreases outwardly, so that the sensor sensitivity also decreases. Concretely, the sensor sensitivity of the portions on the equi-sensitivity curve LA1 decreases by 0.3 step with respect to the central portion, and the sensor sensitivity of the portions on an equi-sensitivity curve LA2 decreases by 0.6 step with respect to the central portion. Further, the sensor sensitivity of the portions on an equi-sensitivity curve LA3 decreases by 0.9 step with respect to the central portion, and the sensor sensitivity of the portions on an equi-sensitivity curve LA4 decreases by 1.2 step with respect to the central portion. Still further, the sensor sensitivity of the portion outside an equi-sensitivity curve LA5 decreases by 1.5 step with respect to the central portion.

In this sensitivity distribution, the reason why the interval between the upper portions of the equi-sensitivity curves is narrower than that of the lower portions thereof is that, as shown in FIG. 1, the light adjusting sensor unit 9 is disposed on an obliquely lower side with respect to the film surface 4 and the angle between the light adjusting lens 10 and the upper section of the film surface 4 is smaller than the angle between the light adjusting lens 10 and the lower section of the film surface 4 and further, even if light is equally given to the film surface 4, the amount of the reflected light from the upper section of the film surface 4 is small while the amount of the reflected light from the lower section of the film surface 4 is large.

Figure 4:
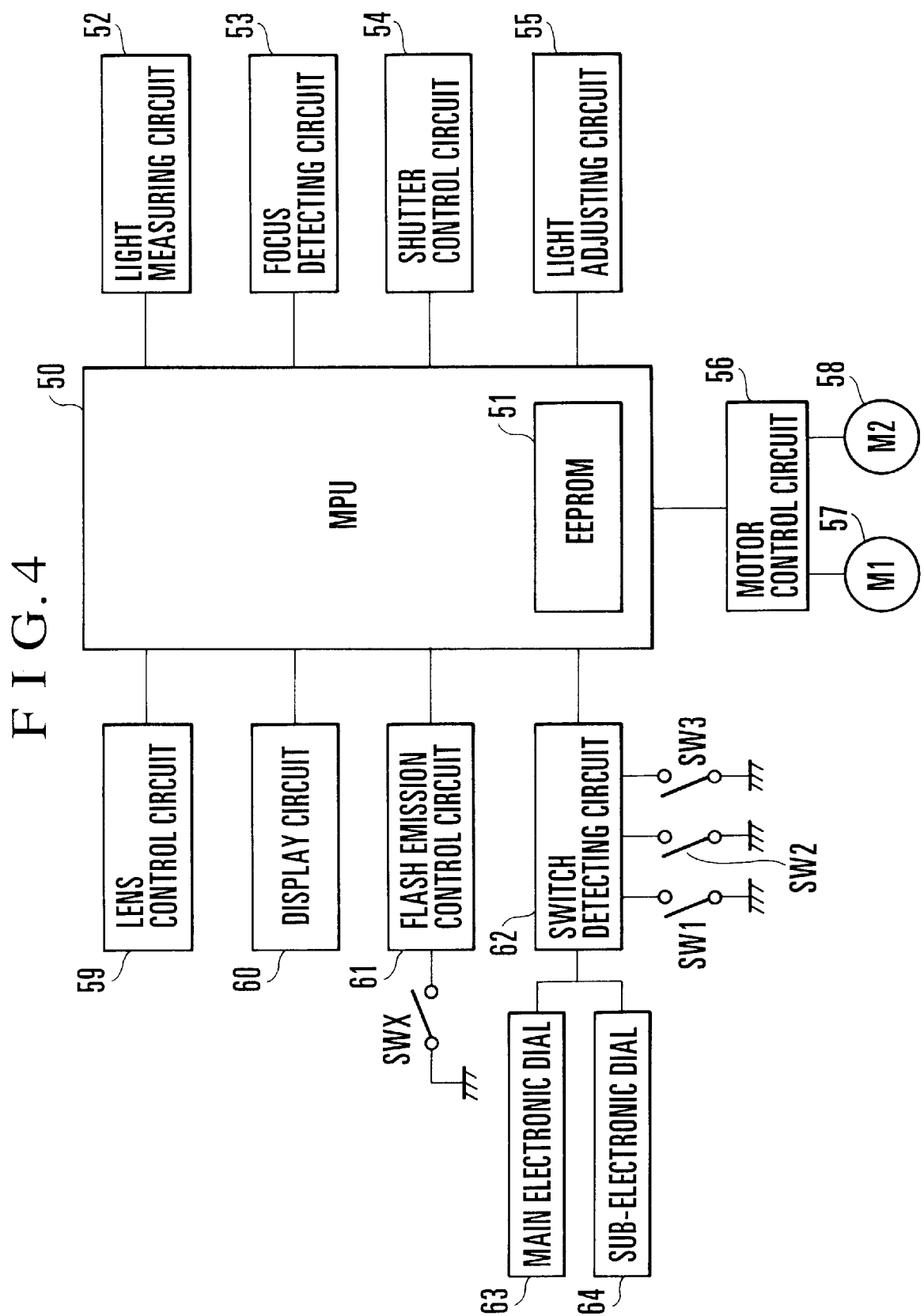
FIG. 4 is a block diagram showing an electric control circuitry of the camera.
Figure 5:
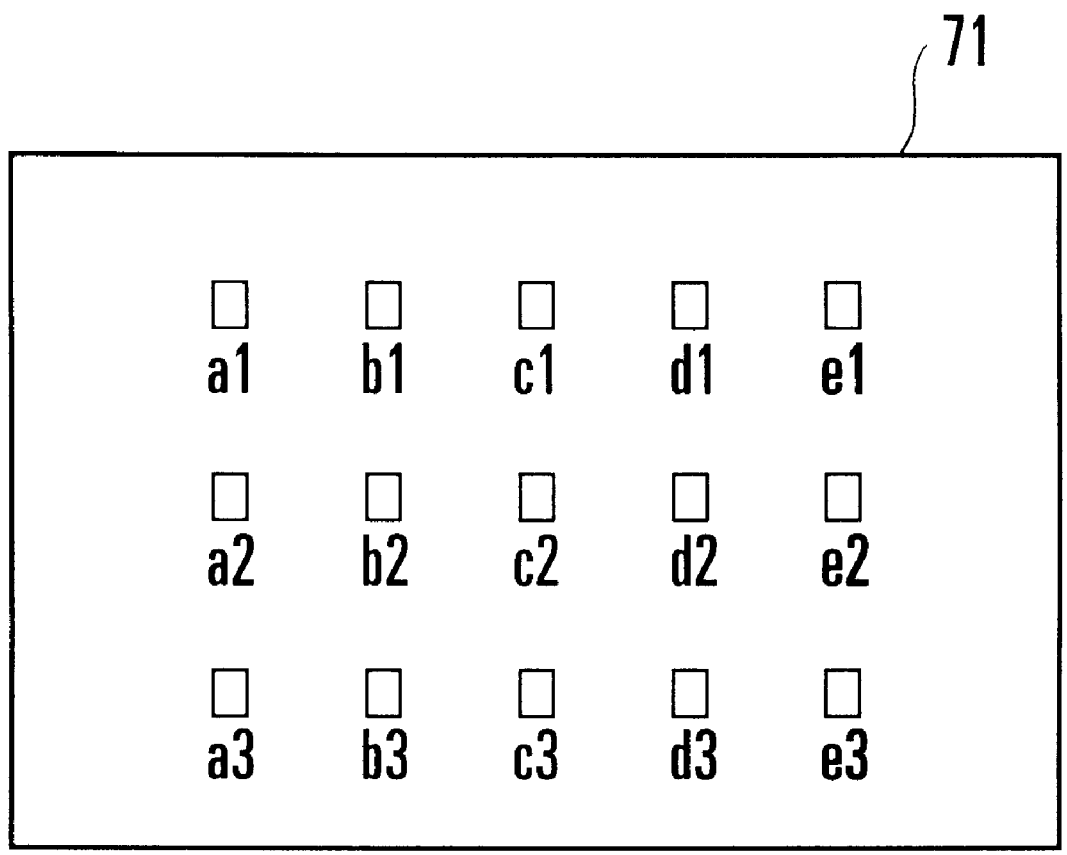
FIG. 5 is an illustration of the disposition of focus detecting areas in the camera.

FIG. 4 illustrates an electric control circuitry of the camera according to the embodiment. Reference numeral 50 represents an MPU for performing various kinds of operation or control, the MPU 50 containing an EEPROM 51 for storing adjustment values and correction amounts for the camera. Further, reference numeral 52 represents a light measuring circuit having a sensor divided into a large number of portions (not shown), and reference numeral 53 denotes a focus detecting circuit which has fifteen focus detecting areas a1 to e3 within a photographing view field 71.

Furthermore, reference numeral 54 depicts a shutter control circuit, reference numeral 55 signifies a light adjusting circuit having the light adjusting sensor unit 9 divided into three sensors as shown in FIG. 2, reference numeral 56 designates a motor control circuit for drive-controlling a motor (M1) 57 for transporting or rewinding a film and a motor (M2) 58 for driving the mirror and mechanically charging the shutter.

Still further, reference numeral 59 designates a lens control circuit for driving a focusing lens (not shown) and a diaphragm (not shown), reference numeral 60 represents a display circuit for displaying the condition of the camera, the calculated TV value and AV value and others, and reference numeral 61 denotes a flash emission control circuit which undergoes control during flash photography, and which starts the flash light emission in response to the turning-on of a switch SWX caused by the travel of the leading curtain of the shutter.

Moreover, reference numeral 62 denotes a switch detecting circuit for sensing the setting manipulation or mechanical operation in the camera. The switch detecting circuit 62 is composed of a switch SW1 for starting light measurement, focus detection or the like, a switch SW2 for starting a release operation, a switch SW3 for selection of a focus detecting area, a main electronic dial 63 and sub-electronic dial 64 for setting the TV value or the AV value, and others.

Figure 6A:
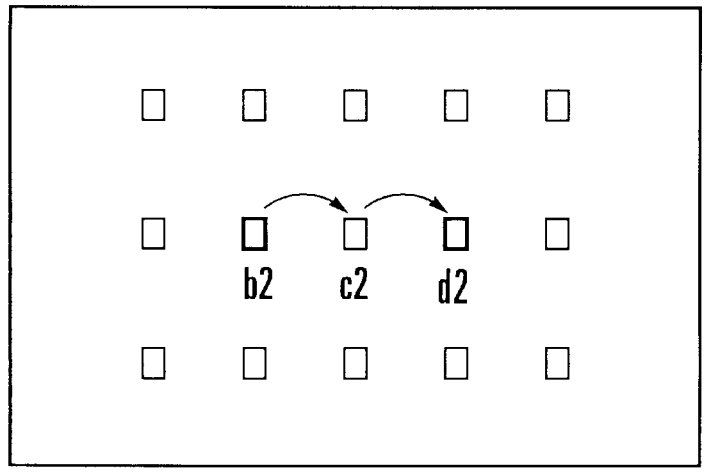
FIGS. 6(a) to 6(c) are illustrations useful for describing a method of selecting an in-focus area from the focus detecting areas.
Figure 6B:
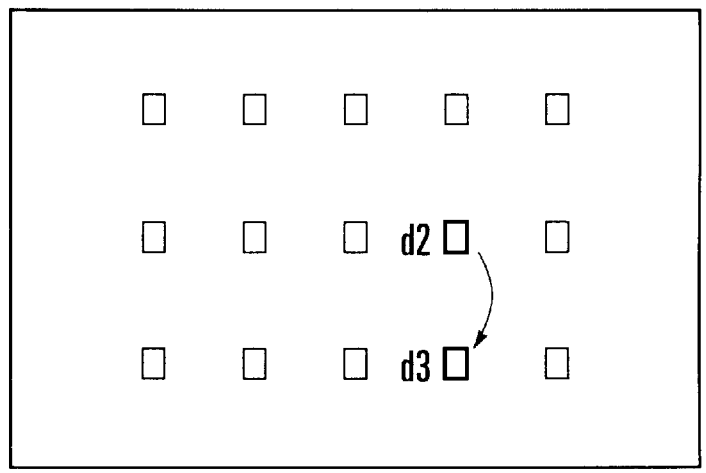

In this case, the main electronic dial 63 and the sub-electronic dial 64 are also used for setting the selection of the focus detecting area. This selection setting method will briefly be described with reference to FIGS. 6(a) to 6(c). FIGS. 6(a) and 6(b) show the setting method to be taken for the case where, of the fifteen focus detecting areas, the in-focus area in which the camera conducts a focusing operation is set arbitrarily. When the focus detecting area selection switch SW3 is pressed in the state shown in FIG. 6(a), if the in-focus area set previously is a focus detecting area b2, the fact that the focus detecting area b2 is selected is lighting-displayed on an LCD display placed outside the camera or a well-known intra-viewfinder superimposing display by the display circuit 60. In this state, for example, when the main electronic dial 63 is rotated rightward by two clicks, the lighting display shows the rightward movement of b2→c2→d2, and the focus detecting area d2 is set as the present in-focus area. Further, in this state, if the sub-electronic dial 64 is rotated rightward by one click, as shown in FIG. 6(a), the lighting display shows the downward movement of d2→d3, and the focus detecting area d3 is set as the present in-focus area.

Likewise, in a manner that the main electronic dial 63 is rotated leftward, the leftward movement setting of the in-focus area is possible, and the leftward rotation of the sub-electronic dial 64 allows the upward movement setting of the in-focus area.

Figure 6C:
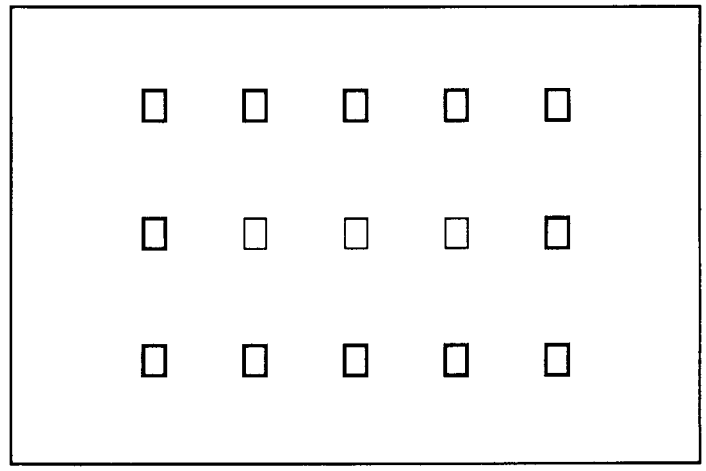

Moreover, in a case where the main electronic dial 63 is further rotated rightward by two clicks from the state where the focus detecting area d2 is set as the in-focus area as shown FIG. 6(a), or in a case where the sub-electronic dial 64 is further rotated rightward by one click from the state where the focus detecting area d3 is set as the in-focus area as shown in FIG. 6(b), all the areas lying in the circumferential section of the fifteen focus detecting areas are lighting-displayed, as shown in FIG. 6(c), and the camera automatically selects one focus detecting area as the in-focus area from the fifteen focus detecting areas in accordance with the subject, so that an automatic focus detecting area selecting mode is set for the focusing operation.

Incidentally, it is also possible that, from the state of being set to the automatic focus detecting area selecting mode, an arbitrary focus detecting area is again set as the in-focus area through the procedure opposite to the above.

Figure 7:
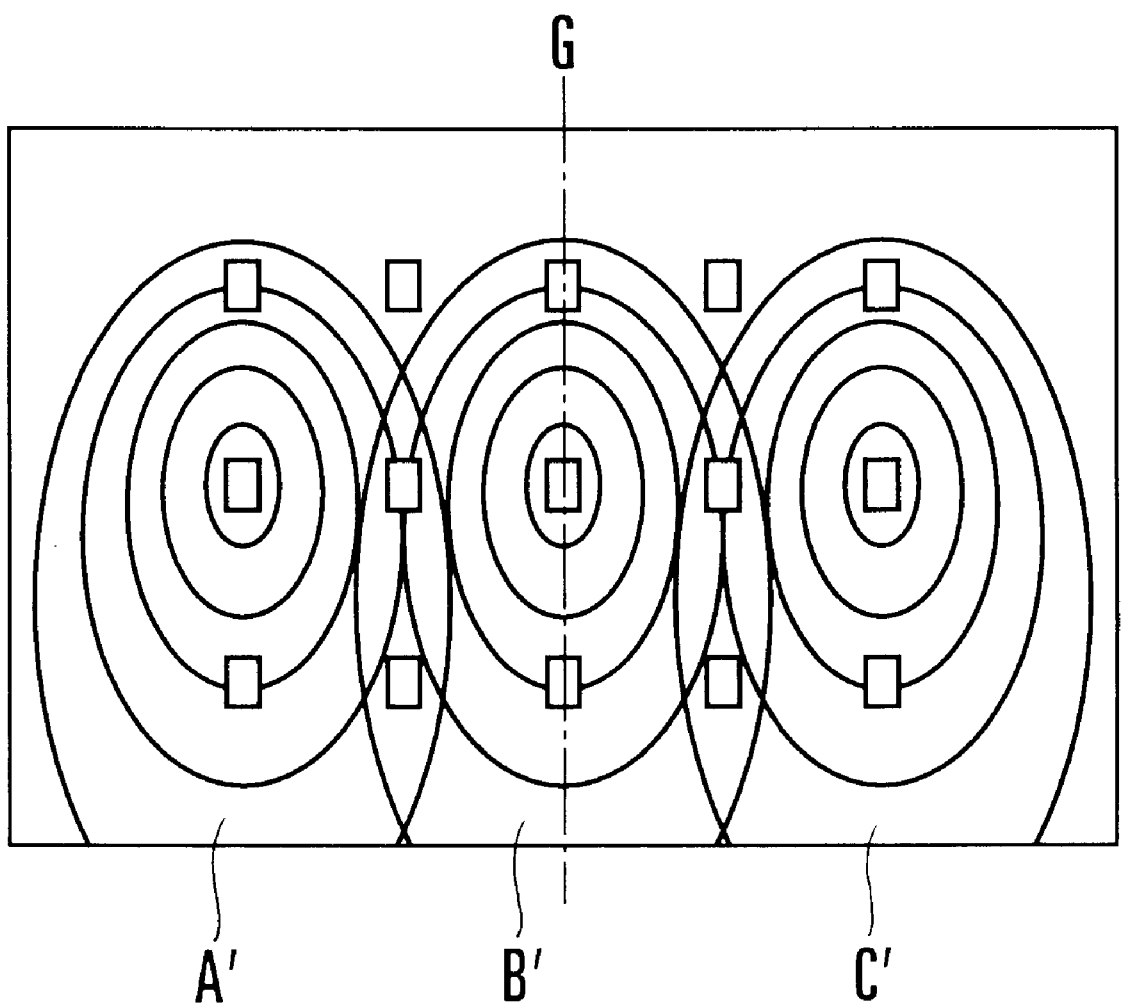
FIG. 7 is an illustration useful for explaining the relationship between the focus detecting areas and the sensitivity distribution of the light adjusting sensor unit.

FIG. 7 shows the relationship among the photographing view field 71, the fifteen focus detecting areas a1 to e3 and the light amount detectable areas A', B' and C' of the light adjusting sensors A, B and C in the camera according to the embodiment. Specifically, the optical disposition of the light adjusting lens 10 is made so that the focus detecting area a2 is disposed at a portion of the light amount detectable area A' of the sensor A which exhibits the maximum sensor sensitivity, and the focus detecting area c2 is disposed at a portion of the light amount detectable area B' of the sensor B which exhibits the maximum sensor sensitivity, and the focus detecting area e2 is disposed at a portion of the light amount detectable area C' of the sensor C which exhibits the maximum sensor sensitivity.

Furthermore, the focus detecting areas a1, c1 and e1 are respectively disposed at portions (on the equi-sensitivity curves LA4) of the light amount detectable areas A', B' and C' where their sensor sensitivities are lower by 1.2 step than the maximum sensor sensitivity, while the focus detecting areas a3, c3 and e3 are respectively disposed at portions (on the equi-sensitivity curves LA3) of the light amount detectable areas A', B' and C' where their sensor sensitivities are lower by 0.9 step than the maximum sensor sensitivity. Moreover, the focus detecting area b2 is located at a portion (on the equi-sensitivity curve LA4) of the light amount detectable areas A' and B' where their sensor sensitivities are lower by 1.2 step than the maximum sensor sensitivity, while the focus detecting area d2 is located at a portion (on the equi-sensitivity curve LA4) of the light amount detectable areas B' and C' where their sensor sensitivities are lower by 1.2 step than the maximum sensor sensitivity.

Still further, the focus detecting areas b1 and b3 are respectively located at portions (near the equi-sensitivity curves LA5) of the light amount detectable areas A' and B' where their sensor sensitivities are lower by 1.5 step than the maximum sensor sensitivity, while the focus detecting areas d1 and d3 are disposed at portions (near the equi-sensitivity curves LA5) of the light amount detectable areas B' and C' where their sensor sensitivities are lower by 1.5 step than the maximum sensor sensitivity.

Besides, the fifteen focus detecting areas a1 to e3 and the sensors A, B, C are symmetrically disposed in the right-hand and left-hand directions with respect to a line G positioned at the center of the image plane.

Figure 8:
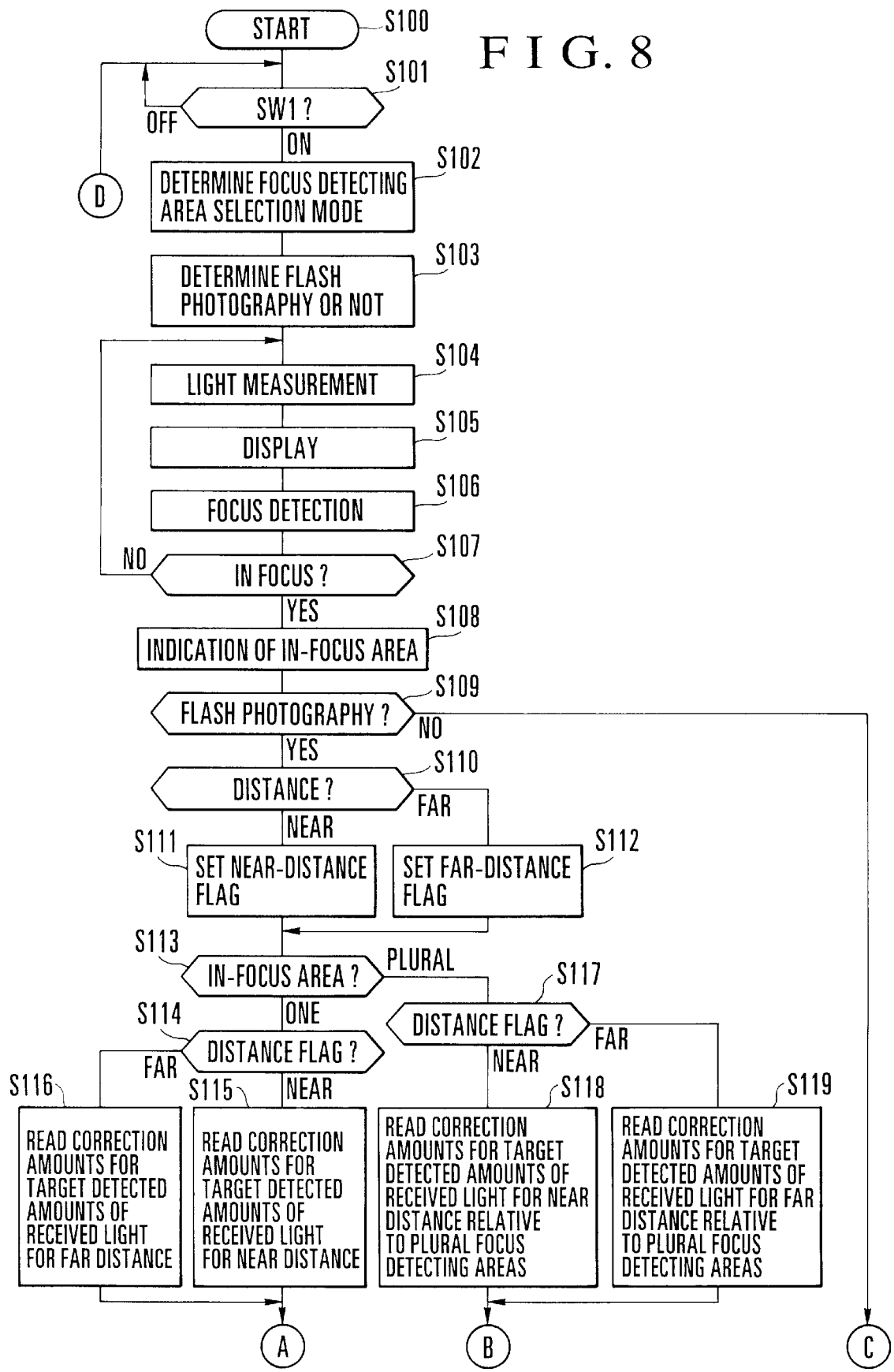
FIG. 8 is a flow chart showing an operation of the camera.
Figure 9:
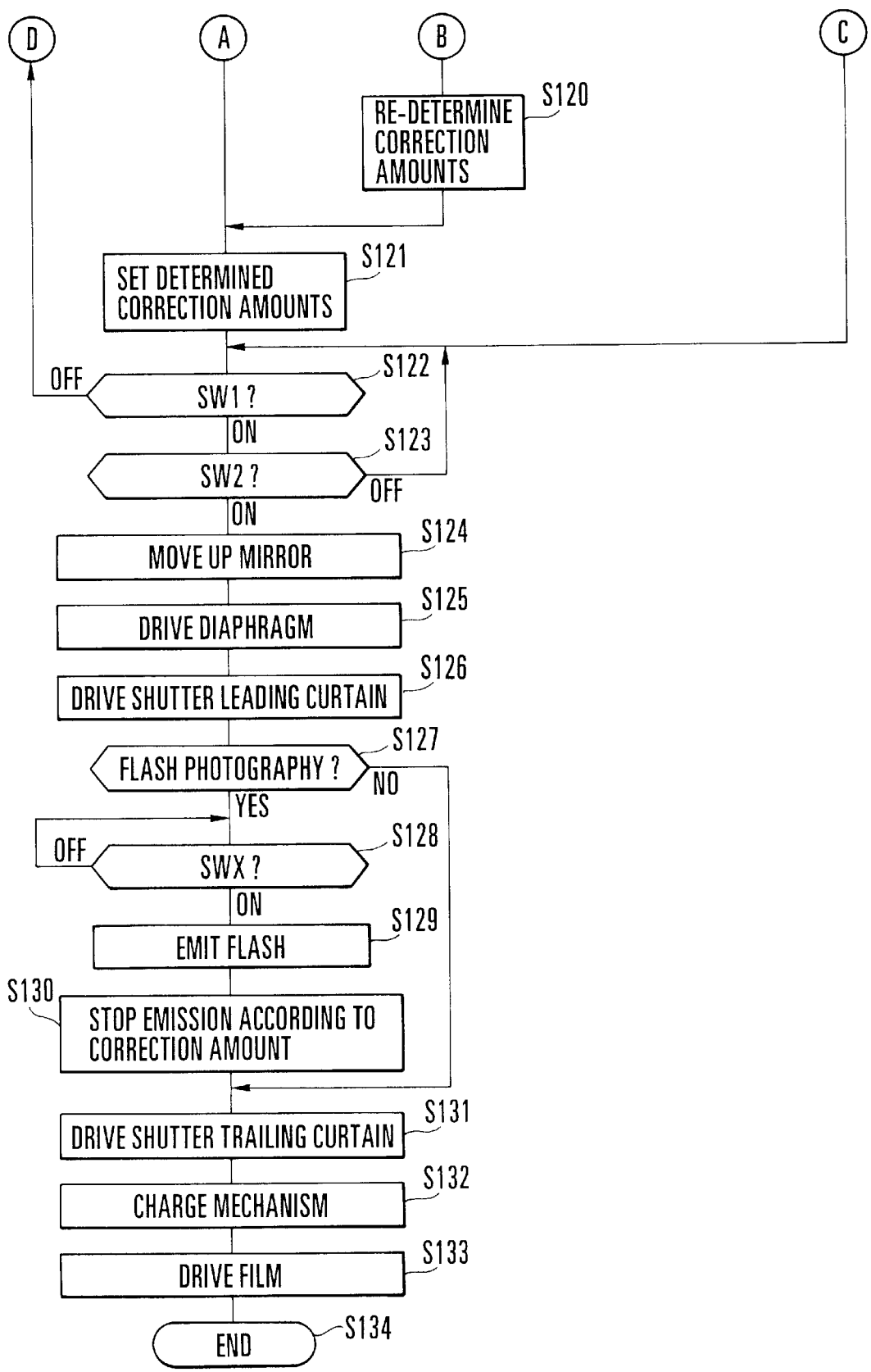
FIG. 9 is a flow chart showing the operation of the camera, continuing from FIG. 8.
Figures 12, 13:
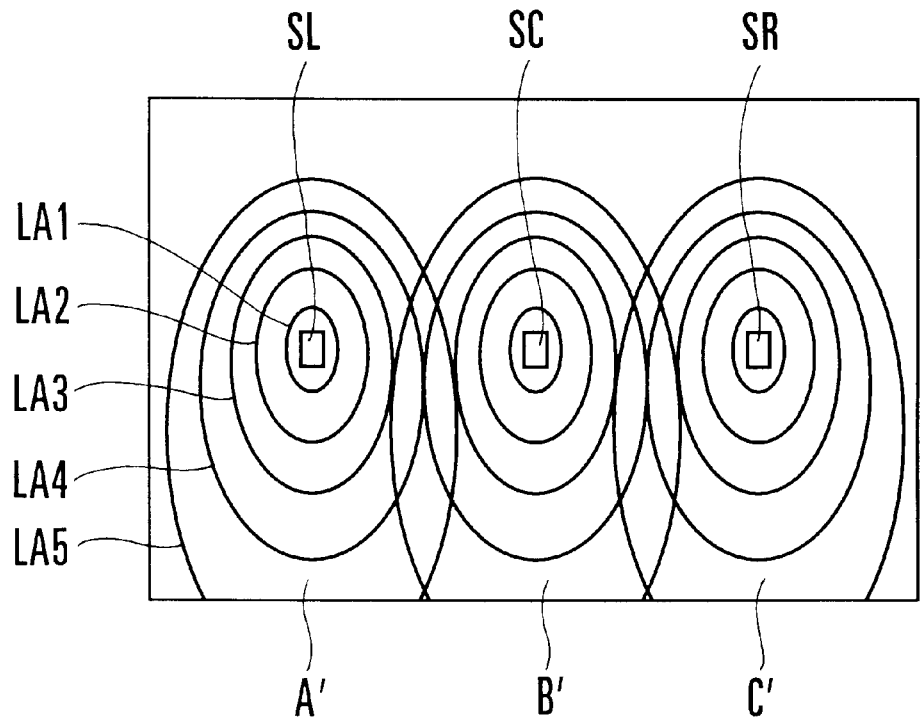
FIG. 12 is an illustration of the relationship between the focus detecting areas and the sensitivity distribution of a light adjusting sensor unit in a conventional camera.
FIG. 13 is a table showing correction data for a target detected amount of received light in a conventional light adjusting sensor unit.

Secondly, referring to the flow charts of FIGS. 8 and 9, a description will follow of an operation of the camera thus arranged. The lines shown by characters A to D surrounded by a circle in FIG. 8 are coupled to the lines shown by characters A to D surrounded by a circle in FIG. 9.

When the power supply of the camera is turned on, the operation starts (S100), followed by a step S101 to detect the status of switch SW1 for starting light measurement, focus detection, and others. At this time, if a decision is made that the switch SW1 is in the ON state, the operational flow advances to a step S102 to decide whether the focus detecting area selecting mode is an arbitrary focus detecting area selecting mode where the photographer arbitrarily selects the focus detecting area as mentioned with reference to FIGS. 6(a) and 6(b) so that the focusing operation is done in the selected focus detecting area, or an automatic focus detecting area selecting mode where the camera automatically selects one from among all the focus detecting areas by deciding the status of the subject for performing the focusing operation in the selected focus detecting area. Subsequently, a step S103 follows to decide whether the camera is set to a normal AF photography or a flash photography. In the embodiment, the flash photography can rely on a flash device built in the camera or a clip-on type flash device placed in the external and coupled to the camera.

Following this, a step S104 is done for driving the light measuring circuit 52 including a light measuring sensor divided into many sections to measure the brightness of external light.

Furthermore, a step S105 follows to drive the intra-viewfinder display or the external display (not shown) through the display circuit 60 for displaying the TV value and AV value calculated on the basis of the value obtained in the step S104, the focus detecting area selecting mode decided in the step S102, the flash photography or no flash photography decided in the step S103, and others.

Subsequently, in a step S106, the focus detecting circuit 53 is driven in accordance with the focus detecting area selecting mode decided in the step S102 and a focus drive unit within the lens control circuit 59 is driven for performing focus detection and a focusing operation.

In addition, almost concurrently with this operation, in a step S107, a decision is made as to whether an in-focus condition is present, and if not in the in-focus condition, the operational flow returns to the step S104 to repeat the above-mentioned operation steps. On the other hand, if in the in-focus condition, the operational flow proceeds to a step S108 to inform the photographer of the in-focus condition. In this case, the display is done by the well-known intra-viewfinder superimposing display or the like, and in the in-focus condition at the point of arbitrary selection, that arbitrary selection point (in-focus area) can be lighting-displayed, whereas in the in-focus condition under the automatic selection the in-focus area automatically selected by the camera itself can be lighting-displayed, and further, a plurality of in-focus areas including the focus detecting area within a given depth of field may be lighting-displayed.

Subsequently, a step S109 is executed to decide, for example, whether the set condition or charged condition of the flash device is completed or not, and further to decide whether or not to do the flash photography. If not performing the flash photography, the operational flow proceeds to a step S122. If the decision indicates flash photography, the operational flow advances to a step S110 to obtain the distance from the stopping position of the lens 1 being in the in-focus condition to the subject. If the distance is nearer than a predetermined value, the operational flow proceeds to a step S111 to set a near-distance flag on a RAM, and if the distance is farther than the predetermined value, the operational flow goes to a step S112 to set a far-distance flag on the RAM.

Thereafter, the operational flow advances to a step S113 to decide whether the number of the focus detecting areas displayed in the step S108 is one or a plurality. If one, a step S114 follows to read out the distance flag set in the step S11 or S112. If the near-distance flag is set, a step S115 is executed to read out correction amounts (evaluation criterion or weighting) for target detected amounts of received light for the light adjusting sensors A, B and C with respect to the in-focus area, from data preset as shown in FIG. 11. Further, if the far-distance flag is set, a step S116 is executed to read out correction amounts (evaluation criterion or weighting) for target detected amounts of received light for the light adjusting sensors A, B and C with respect to the in-focus area, from data preset as shown in FIG. 10.

In the embodiment, as shown in FIGS. 10 and 11, the respective correction data for target detected amounts of received light for the three light adjusting sensors A, B and C to be taken when each of the fifteen focus detecting areas a1 to e3 is selected as the in-focus area are separately given for the case where the subject is at a near distance and for the case where the subject is at a far distance.

In the correction data, each of the correction amount (evaluation criterion) for the target detected amount of received light for the light adjusting sensor A in the case where the focus detecting area a2 is selected as the in-focus area, the correction amount (evaluation criterion) for the target detected amount of received light for the light adjusting sensor B in the case where the focus detecting area c2 is selected as the in-focus area and the correction amount (evaluation criterion) for the target detected amount of received light for the light adjusting sensor C in the case where the focus detecting area e2 is selected as the in-focus area is set to be 0 step, while the correction amount (evaluation criterion) for the light adjusting sensors not including the in-focus area within their light amount detectable areas in each of these cases is set to be +1.0 step. That is, for example, in a case where only the sensor A includes the in-focus area, the correction amount for the sensors B and C is set to +1.0 step.

In this instance, the correction amount "0 step" signifies that the target detected amount of received light is set, as it stands, through the use of a value directly calculated on the basis of the film ISO sensitivity, the aperture value or the like, and the correction amount "+1.0 step" means that the target detected amount of received light is set to exceed that value by +1.0 step. This is for the purpose of, in the case of bringing a central subject into focus and of photographing the central subject with a proper flash light amount and in a scene where the central subject is considerably remote and an object exists at a left or right position closer than the central subject, preventing the left or right object from abnormally resulting in an overexposure.

However, in a case where each of the focus detecting areas other than the aforesaid focus detecting areas a2, c2 and e2 is selected as the in-focus area and the flash photography is done, the sensitivity distribution of the light adjusting sensor has a great influence. For instance, in the case where the focus detecting area b1 is selected as the in-focus area, if the flash photography control is conducted with the same target detected amount of received light for the sensor A as the case where the focus detecting area a2 is selected as the in-focus area, the real detected amount of received light in the light adjusting sensor A does not become equal to the target detected amount as long as the flash light more by 1.5 step than that of the case of the selection of the focus detecting area a2 is not received, and hence, an excessive flash light amount is given to the subject, thus resulting in an overexposed picture.

For this reason, in the embodiment, the value corresponding to the sensitivity decrease from the maximum sensitivity of the light adjusting sensor at the portion where the in-focus area is located is set as the correction amount (evaluation criterion) for the light adjusting sensor including the in-focus area within its light amount detectable area, while the correction amount (evaluation criterion) for weighting by 1 step with respect to the aforesaid correction amount (evaluation criterion) is set for the light adjusting sensor not including the in-focus area within its light amount detectable area. Further, in a case where the focus detecting area disposed within the light amount detectable areas of a plurality of light adjusting sensors is selected as the in-focus area, the plurality of light adjusting sensors are set to be mainly subjected to correction. That is, when each of the focus detecting areas b1 to b3 is selected as the in-focus area, the light adjusting sensors A and B are mainly weighted for the correction. On the other hand, when each of the focus detecting areas d1 to d3 is selected as the in-focus area, the light adjusting sensors B and C are mainly weighted for the correction.

Furthermore, the correction amount for the light adjusting sensor including the in-focus area within its light amount detectable area varies between the case of the far distance and the case of the near distance. That is, since the size of the subject is small in the case of the far distance so that the sensitivity distribution of the light adjusting sensor tends to have a great influence, the correction amount is determined in such a manner that the sensitivity distribution has priority in some degree. On the other hand, in the case of the near distance, a subject for reflecting the flash light may exist in the vicinity of the in-focus area selected or the reflected light tends to more enter the light adjusting sensor as compared with the case of the far distance. Accordingly, for the light adjusting sensor including the in-focus area within its light amount detectable area, the correction amount in the case of the near distance is set to be approximately ½ of the correction amount in the case of the far distance.

These correction data are previously written in the EEPROM 51 of the MPU 50 and read out and processed properly during the flash light emission control.

Returning to the flow charts, in the case where, in the step S113, the in-focus area displayed in the step S108 takes a plurality of areas, the operational flow advances to a step S117 to read out the distance flag set in the step S111 or S112 in the same manner as in the step S114. If the near-distance flag is set, the operational flow proceeds to a step S118 to read out correction amounts for target detected amount of received light for the light adjusting sensors A, B and C, from the data shown in FIG. 11, with respect to all of the plurality of in-focus areas. On the other hand, if the far-distance flag is set, the operational flow proceeds to a step S119 to read out correction amounts for target detected amounts of received light for the light adjusting sensors A, B and C, from the data shown in FIG. 10, with respect to all of the plurality of in-focus areas. Subsequently, the operational flow proceeds to a step S120, which is a correction amount re-determining step where the correction amounts to be used finally are calculated on the basis of the plurality of correction data read out in the step S118 or S119.

As a calculation method to be taken here, for example, in the case of the far distance, when all of the focus detecting areas a1, b1, c1, d1 and e1 existing at the upper section are selected as the in-focus area, the correction amount for each of the light adjusting sensors is calculated to assume the smallest value. That is, the correction amount for the light adjusting sensor A takes the smaller none (−1.5 step) of −1.2 step of the focus detecting area a1 and −1.5 step of the focus detecting area b1, and likewise, the correction amount for the light adjusting sensor B assumes the smallest (−1.5 step) of −1.5 step of the focus detecting areas b1 and d1 and −1.2 step of the focus detecting area c1. Further, the correction amount for the light adjusting sensor C employs −1.5 step of the focus detecting area d1. Thus, −1.5 step is employed as each of the final correction amounts for the light adjusting sensors A, B and C.

Furthermore, in the case of the far distance, when all of the focus detecting areas a1, a2 and a3 existing on the left side are selected as the in-focus area, the correction amount for the light adjusting sensor A takes the smallest (−1.2 step) of −1.2 step, 0 step and −0.6 step of the focus detecting areas a1, a2 and a3, while the correction amount for each of the other light adjusting sensors B and C is obtained by weighting that value by +1 step. Thus, the final correction amounts assume −1.2 step for the sensor A, and −0.2 step for each of the sensors B and C.

The correction amounts determined in the steps S115, S116 and S120 are set in the flash emission control circuit 61. Whereupon, for the light adjusting sensor including the in-focus area within its light amount detectable area, the target detected amount of received light is set in accordance with the sensor sensitivity of the portion where that in-focus area exists. On the other hand, for the light adjusting sensor not including the in-focus area within its light amount detectable area, a value higher by 1 step than the aforesaid target detected amount of received light is set as the target detected amount of received light.

Thereafter, the operational flow advances to a step S122 to check the turning-on or turning-off of the switch SW1 for the decision as to whether or not to proceed for an exposure operation. If the switch SW1 is in the turning-off state, the operational flow returns to the step S101 after clearing the calculated values, the correction amounts and others. On the other hand, if the switch SW1 is in the turning-on state, a step S123 is executed to check the turning-on or turning-off of the switch SW2 for the decision as to whether to start the exposure operation. If the switch SW2 turns off, the operational flow returns to the step S122. If the switch SW1 is in the turning-on state, the steps S122 and S123 are repeatedly conducted to wait for the turning-on of the switch SW2.

If the step S123 shows the turning-on of the switch SW2, the exposure operation starts. Further, a step S124 is executed to drive the motor (M2) through the motor control circuit 56 to move the mirror upward, then followed by a step S125 to operate the diaphragm within the lens control circuit 59 so that the aperture assumes a predetermined value. Then, a step S126 is executed to make the shutter control circuit 54 drive the leading curtain of the shutter, then followed by a step S127.

In the step S127, as in the step S109, a decision is made as to whether or not to perform the flash photography. If not in the flash photography set condition, the operational flow advances to a step S131 to make the shutter control circuit 54 drive the trailing curtain of the shutter for a shutter speed according to the TV value, as an ordinary AE (automatic exposure) photography.

If the decision of the step S127 indicates the flash photography condition, a step S128 follows to wait for the turning-on of the switch SWX of the flash emission control circuit 61, and when the switch SWX turns on, a step S129 is executed to start the flash light emission.

Following this, in a step S130, the flash light reflected from the film surface 4, detected by each of the three light adjusting sensors A, B and C, is monitored and integrated, and when any one of the integrated values (real detected amounts of received light) by the light adjusting sensors A, B and C reaches the target detected amount of received light (correction amount) for that light adjusting sensor set in the flash emission control circuit 61 in the step S121, the flash light emission is brought to a stop.

Accordingly, even if the in-focus area is selected at any one of portions within the light amount detectable area of the light adjusting sensor having diversified detection sensitivities, a proper flash light exposure is reliably attainable. Therefore, even if fifteen focus detecting areas a1 to e3 are provided as in the present embodiment, the use of only three light adjusting sensors A, B and C can provide an appropriate flash light exposure regardless of the position of the in-focus area selected.

Simultaneously with the stop of the flash light emission, in the step S131, the trailing curtain of the shutter is driven for the shutter speed, generally called the synchroflash time, thus completing the exposure operation. Thereafter, in a step S132, the motor (M2) 58 is driven through the motor control circuit 56 to operate the mechanical sections such as moving the mirror downward and moving the shutter to the initial position, and almost concurrently with this, in a step S133, the motor (M1) 57 is also driven to rewind the film. The operational flow terminates at a step S134.

Although in the description of the present embodiment fifteen focus detecting areas are provided and three light adjusting sensors are provided, the number of the focus detecting areas and the number of the light adjusting sensors are not limited to such values.

Furthermore, although in the present embodiment the flash light emission is brought to a stop when the output of any one of the sensors A, B and C reaches a corresponding one of the target detected amounts of received light respectively set for the sensors A, B and C, it is also appropriate that the coefficient corresponding to the correction amount determined for each of the sensors is weighted for each of the sensor outputs and the flash light emission is brought to a stop when the value obtained by summing up these sensor outputs reaches a given value.

Further, although the present embodiment relates to a light adjusting operation, it is also appropriate that the coefficient corresponding to each of the correction amounts determined as mentioned above is weighted in relation to each of the sensor outputs and the emission light amount of the flash device is calculated on the basis of the value obtained by summing up the weighted sensor outputs so that the flash light amount is determined on the basis of the calculated value and is used for control.

As described above, according to the present invention, since a target detected amount of received light or a target amount of flash light emission for the flash light amount detecting means is set in accordance with the detection sensitivity of a portion of the light amount detectable area of the flash light amount detecting means where the in-focus area exists, an appropriate flash light exposure is reliably obtainable irrespective of the detection sensitivity of the flash light amount detecting means at the position of the in-focus area. Accordingly, a small number of flash light amount detecting means will do for a large number of focus detecting areas, thus contributing to the reduction of the cost and size of the camera.

Furthermore, in the present invention, if the target detected amount of received light for the flash light amount detecting means is set in accordance with the number of selected in-focus areas or the distance from the subject, the variation of the flash emission light amount or the overexposure is preventable regardless of the selecting method of the in-focus area or the subject distance (the size of the subject within the photographing image plane).

Still further, if a plurality of in-focus areas are selected within a light amount detectable area and a target detected amount of received light for the flash light amount detecting means is set in accordance with the lowest of the detection sensitivities of the flash light amount detecting means at the portions holding the plurality of in-focus areas, even in the case where the detection sensitivities corresponding to the respective in-focus areas are different from each other, overexposure is reliably preventable.

Moreover, in a case where a plurality of flash light amount detecting means are provided and a focus detecting area is disposed within light amount detectable areas of the flash light amount detecting means, if the flash light amount detecting means in which the in-focus area is disposed within its light amount detectable area is weighted by a given value to set a target detected amount of received light for the flash light amount detecting means, an appropriate flash exposure is attainable for the main subject being in the in-focus condition, and the overexposure of the subject closer in distance than the main subject is preventable.

Besides, if an erasable and writable memory for storing data of target detected amounts of received light is added, it is possible to simply achieve data correction or the like without changing the main program.

It should be understood that the foregoing relates to only the preferred embodiment of the invention, and that it is intended to cover all changes and modifications of the embodiment of the invention herein used for the purpose of the disclosure, which do not constitute departures from the spirit and scope of the invention.

I claim:

1. A camera system which controls a flash light emission amount of a flash device on the basis of an output of sensor means for receiving reflected light from a subject during flash light emission by the flash device, the camera system having a plurality of focus detecting areas and performing a focus adjusting operation by selecting one or more of the plurality of focus detecting areas, the plurality of focus detecting areas being provided within an image plane area corresponding to a light-receiving area for an image plane in the sensor means, said camera system comprising:

a control circuit which controls the flash light emission amount of the flash device by setting an evaluation criterion for the output of the sensor means in accordance with a position of the light-receiving area in the sensor means corresponding to the selected focus detecting area.

2. A camera system according to claim 1, wherein said control circuit differently weights the output of the sensor means in accordance with a position within the light-receiving area in the sensor means corresponding to the selected focus detecting area.

3. A camera system according to claim 1, wherein said control circuit sets a target amount of received light for the sensor means to a different value in accordance with a position within the light-receiving area in the sensor means corresponding to the selected focus detecting area.

4. A camera system according to claim 1, wherein said sensor means is arranged to have different output sensitivities in accordance with positions of the light-receiving area with respect to the reflected light from the subject during flash light emission, and wherein, when a plurality of focus detecting areas each corresponding to an in-focus area taken during the focus adjusting operation exist within the light-receiving area in the sensor means, said control circuit sets the evaluation criterion on the basis of the lowest of output sensitivities at positions of the light-receiving area of the sensor means corresponding to the plurality of focus detecting areas.

5. A camera system according to claim 1, wherein the sensor means includes a plurality of sensor means and a plurality of focus detecting areas are placed within an image plane area corresponding to a light-receiving area for an image plane in each of the plurality of sensor means, and wherein, when the focus detecting areas corresponding to in-focus areas during the focus adjusting operation exist within the light-receiving areas of two or more sensor means, said control circuit sets an evaluation criterion for an output of each of the sensor means having the light-receiving areas within which the focus detecting areas corresponding to the infocus areas exist to be different from an evaluation criterion for an output of each of the other sensor means.

6. A camera for a flash photography system which controls a flash light emission amount of a flash device on the basis of an output of sensor means for receiving reflected light from a subject during flash light emission by the flash device, the camera system having a plurality of focus detecting areas and performing a focus adjusting operation by selecting one or more of the plurality of focus detecting areas, the plurality of focus detecting areas being provided within an image plane area corresponding to a light-receiving area for an image plane in the sensor means, said camera comprising:

a control circuit which controls the flash light emission amount of the flash device by setting an evaluation criterion for the output of the sensor means in accordance with a position of the light-receiving area in the sensor means corresponding to the selected focus detecting area.

7. A camera according to claim 6, wherein said control circuit differently weights the output of the sensor means in accordance with a position within the light-receiving area in the sensor means corresponding to the selected focus detecting area.

8. A camera according to claim 6, wherein said control circuit sets a target amount of received light for the sensor means to a different value in accordance with a position within the light-receiving area in the sensor means corresponding to the selected focus detecting area.

9. A camera according to claim 6, wherein said sensor means is arranged to have different output sensitivities in accordance with positions of the light-receiving area with respect to the reflected light from the subject during flash light emission, and wherein, when a plurality of focus detecting areas each corresponding to an in-focus area taken during the focus adjusting operation exist within the light-receiving area in the sensor means, said control circuit sets the evaluation criterion on the basis of the lowest of output sensitivities at positions of the light-receiving area of the sensor means corresponding to the plurality of focus detecting areas.

10. A camera according to claim 6, wherein the sensor means includes a plurality of sensor means and a plurality of focus detecting areas are placed within an image plane area corresponding to a light-receiving area for an image plane in each of the plurality of sensor means, and wherein, when the focus detecting areas corresponding to in-focus areas during the focus adjusting operation exist within the light-receiving areas of two or more sensor means, said control circuit sets an evaluation criterion for an output of each of the sensor means having the light-receiving areas within which the focus detecting areas corresponding to the in-focus areas exist to be different from an evaluation criterion for an output of each of the other sensor means.

11. A camera system which controls a flash light emission amount of a flash device on the basis of outputs of a plurality of sensor means including a first sensor means for receiving reflected light from a subject during flash light emission by the flash device, and which performs a focus adjusting operation by selecting one or more of a plurality of focus detecting areas, said camera system comprising:

a plurality of focus detecting areas provided within an image plane area corresponding to a light receiving area of the first sensor means; and a control circuit which sets an evaluation criterion for an output of sensor means other than the first sensor means according to a position of an area selected from among the plurality of focus detecting areas of the first sensor means, wherein said control circuit sets a different evaluation criterion for the output of the sensor means other than the first sensor means when a second area is selected than when a first area is selected from the plurality of focus detecting areas of the first sensor means.

12. A camera system according to claim 11, wherein said camera system comprises a plurality of focus detecting areas for an image plane area corresponding to a light-receiving area of a second sensor means, and said control circuit sets a different evaluation criterion for the output of said first sensor means when the second area is selected than when the first area is selected from among the plurality of focus detecting areas for the second sensor means.

* * * * *

UNITED STATES PATENT AND TRADEMARK OFFICE
CERTIFICATE OF CORRECTION

PATENT NO. : 6,035,139
DATED : March 7, 2000
INVENTOR(S) : Katsunori Nakamura

It is certified that error appears in the above-identified patent and that said Letters Patent is hereby corrected as shown below:

Column 10,
Line 25, "none" should read -- one --.

Column 13,
Line 52, "system" should be deleted.

Signed and Sealed this

Fifth Day of October, 2004

JON W. DUDAS
*Director of the United States Patent and Trademark Office*